Jan. 10, 1956  L. POLLOCK ET AL  2,730,020
MACHINE TOOL
Filed Feb. 9, 1953  5 Sheets-Sheet 1
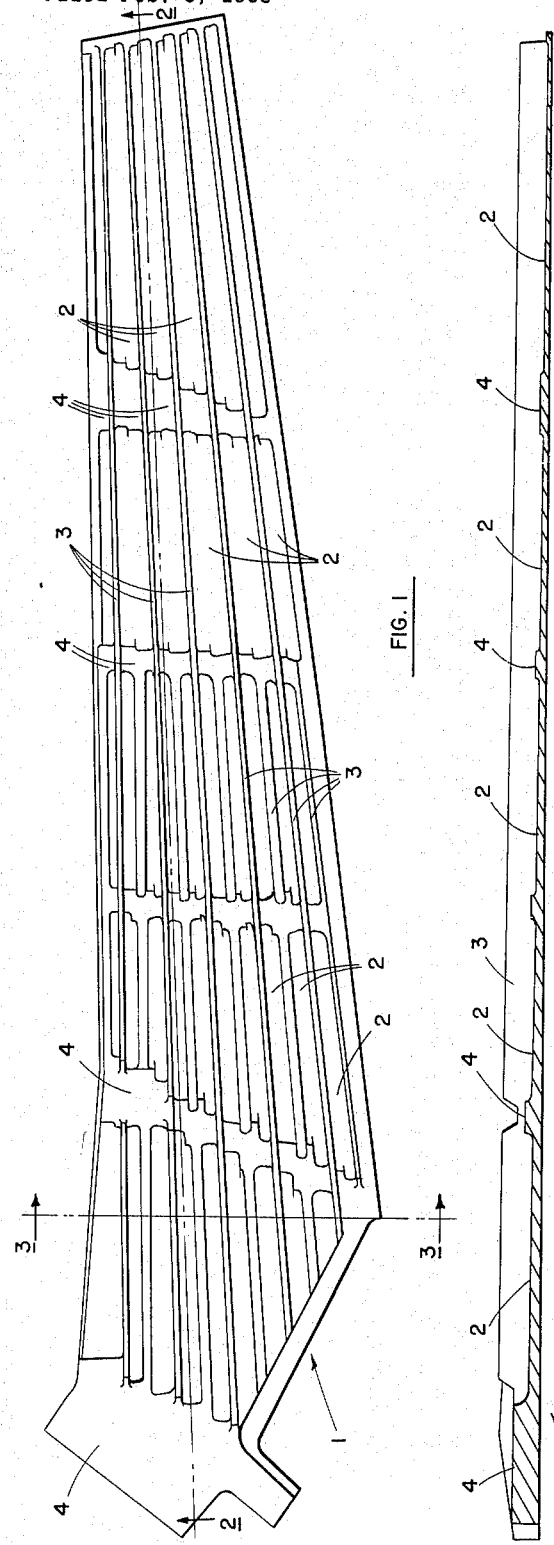
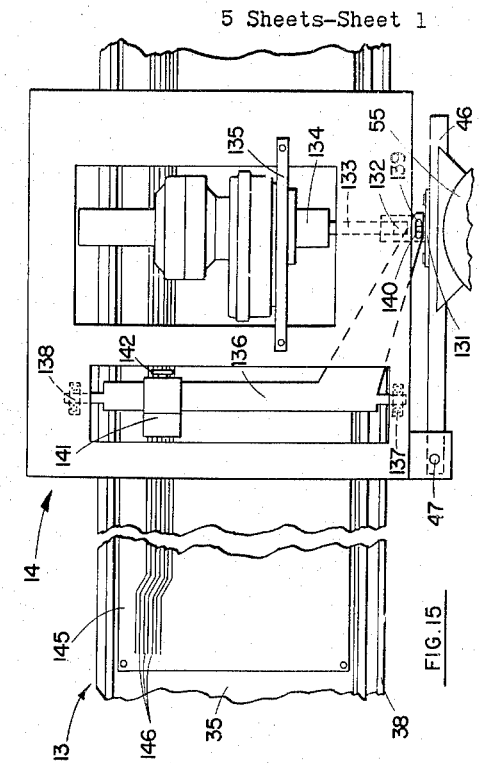
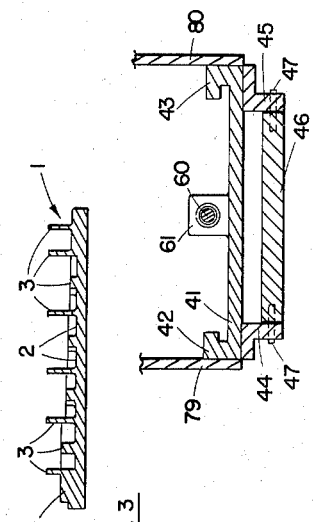
*INVENTORS*
LATHAM POLLOCK
JOE S. APPLETON
BY *William R. Lane*
ATTORNEY

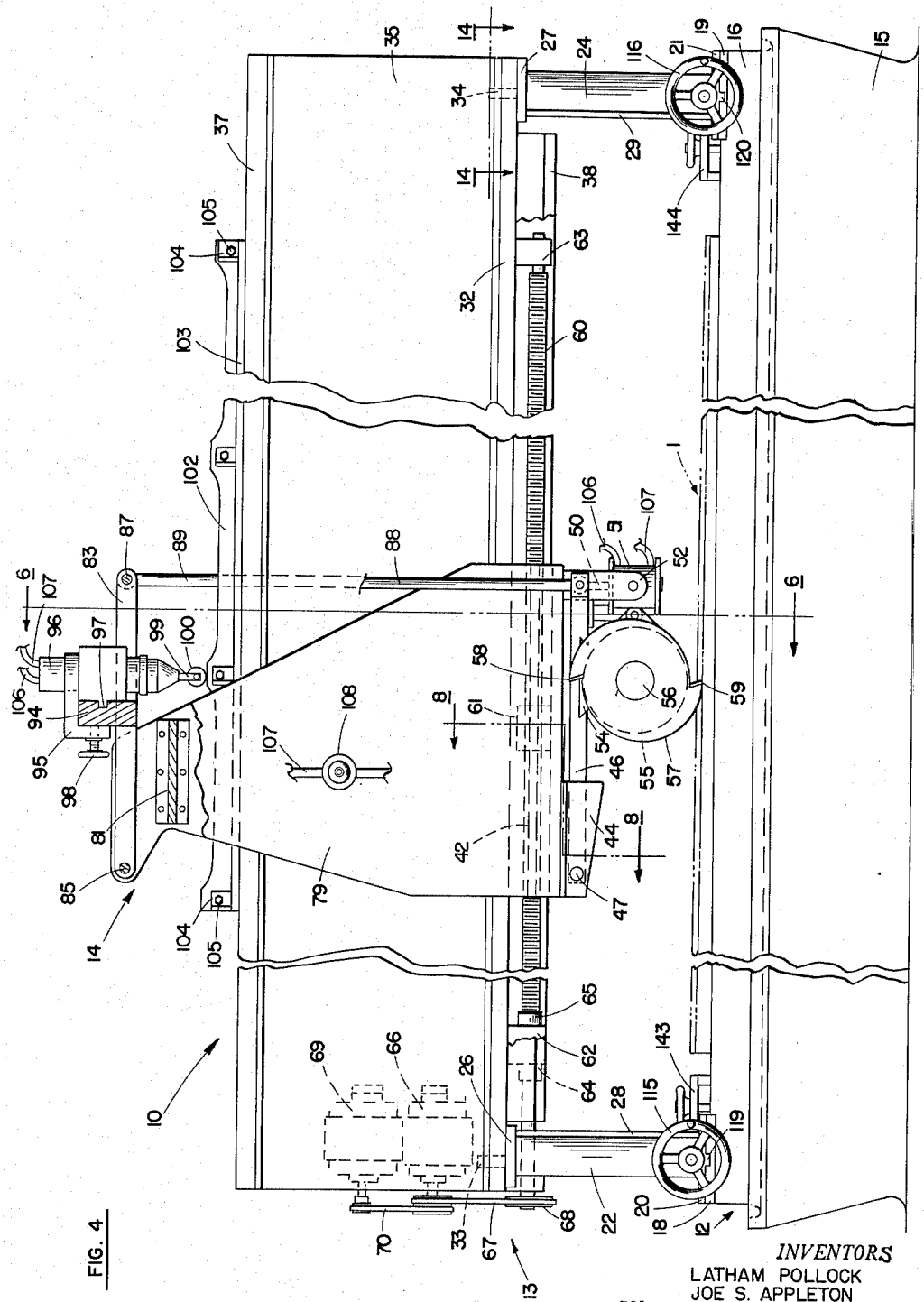

Jan. 10, 1956

L. POLLOCK ET AL 2,730,020

MACHINE TOOL

Filed Feb. 9, 1953

5 Sheets-Sheet 3

*INVENTORS*
LATHAM POLLOCK
JOE S. APPLETON

BY William P. Lane

ATTORNEY

Jan. 10, 1956  L. POLLOCK ET AL  2,730,020
MACHINE TOOL
Filed Feb. 9, 1953  5 Sheets-Sheet 4
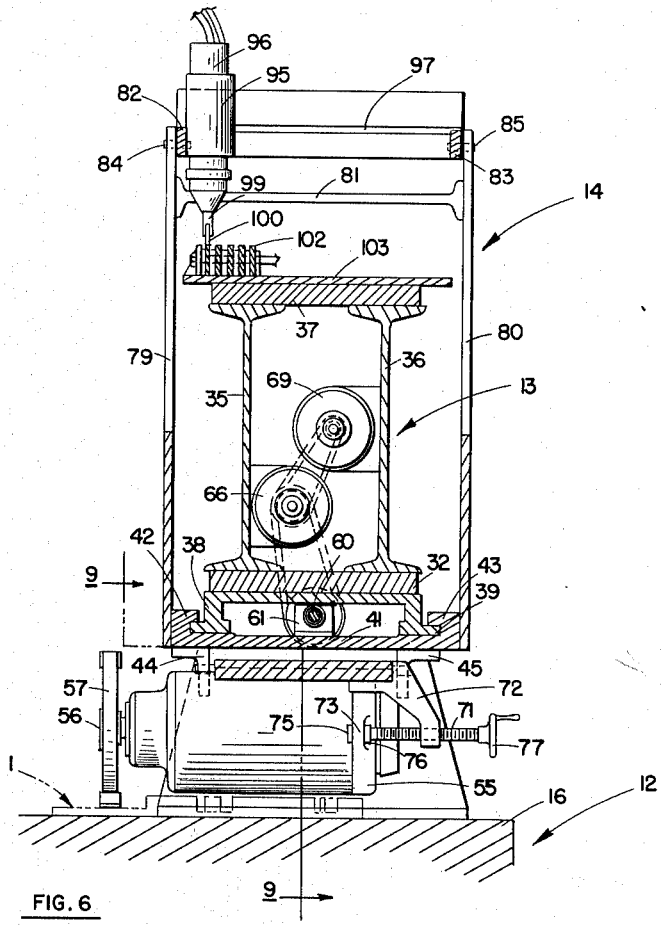
FIG. 6
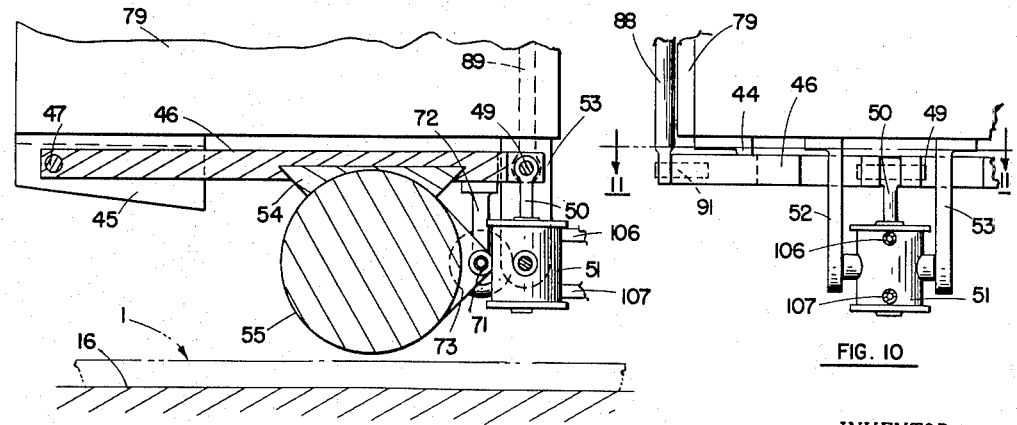
FIG. 9
FIG. 10
INVENTORS
LATHAM POLLOCK
JOE S. APPLETON
BY
William R. Lane
ATTORNEY Jan. 10, 1956    L. POLLOCK ET AL    2,730,020
MACHINE TOOL
Filed Feb. 9, 1953    5 Sheets-Sheet 5
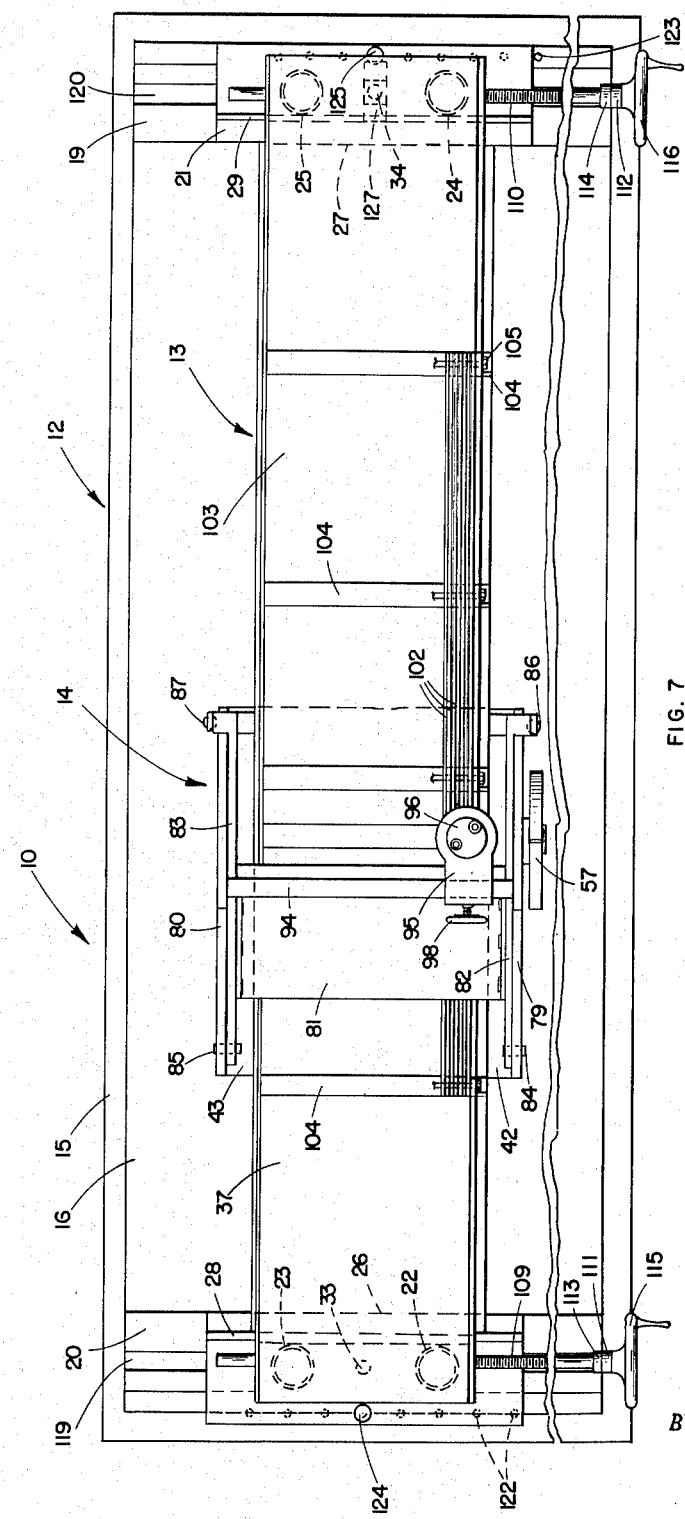
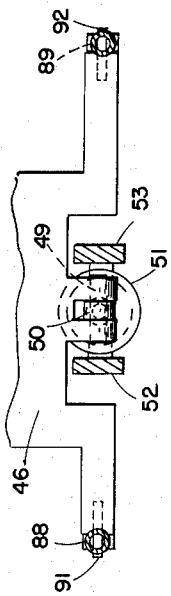
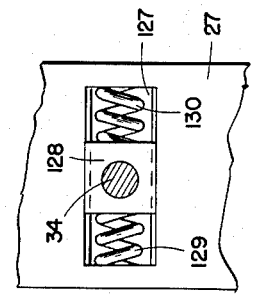
INVENTORS
LATHAM POLLOCK
JOE S. APPLETON
BY
*William C. Lane*
ATTORNEY

United States Patent Office 2,730,020
Patented Jan. 10, 1956

2,730,020

MACHINE TOOL

Latham Pollock, Los Angeles, and Joe S. Appleton, Gardena, Calif., assignors to North American Aviation, Inc.

Application February 9, 1953, Serial No. 335,942

6 Claims. (Cl. 90—13)

This invention relates to a milling machine and more particularly to a milling machine capable of making tapered cuts.

It has become important in manufacturing complicated parts, such as those used in high performance aircraft, to make cuts at various angles relative to each other and at differing depths. For example, for aircraft parts it may be necessary to provide integral skin and stiffener elements, the stiffeners not being parallel or of uniform size, and the skin portion tapered and sculptured throughout its length. The machines capable of producing such parts have in the past been very costly, large, complex and cumbersome.

Therefore it is an object of this invention to provide a machine capable of making parallel or non-parallel cuts.

Another object of this invention is to provide a machine which will automatically vary the depth of a cut according to a predetermined pattern.

Still another object of this invention is to provide a machine in which the cutter is moved, but the bed remains stationary.

A still further object of this invention is to provide a machine which is characterised by its economy in construction and its accuracy in work.

Yet another object of this invention is to provide a machine capable of producing tapered and sculptured parts.

Figure 5:
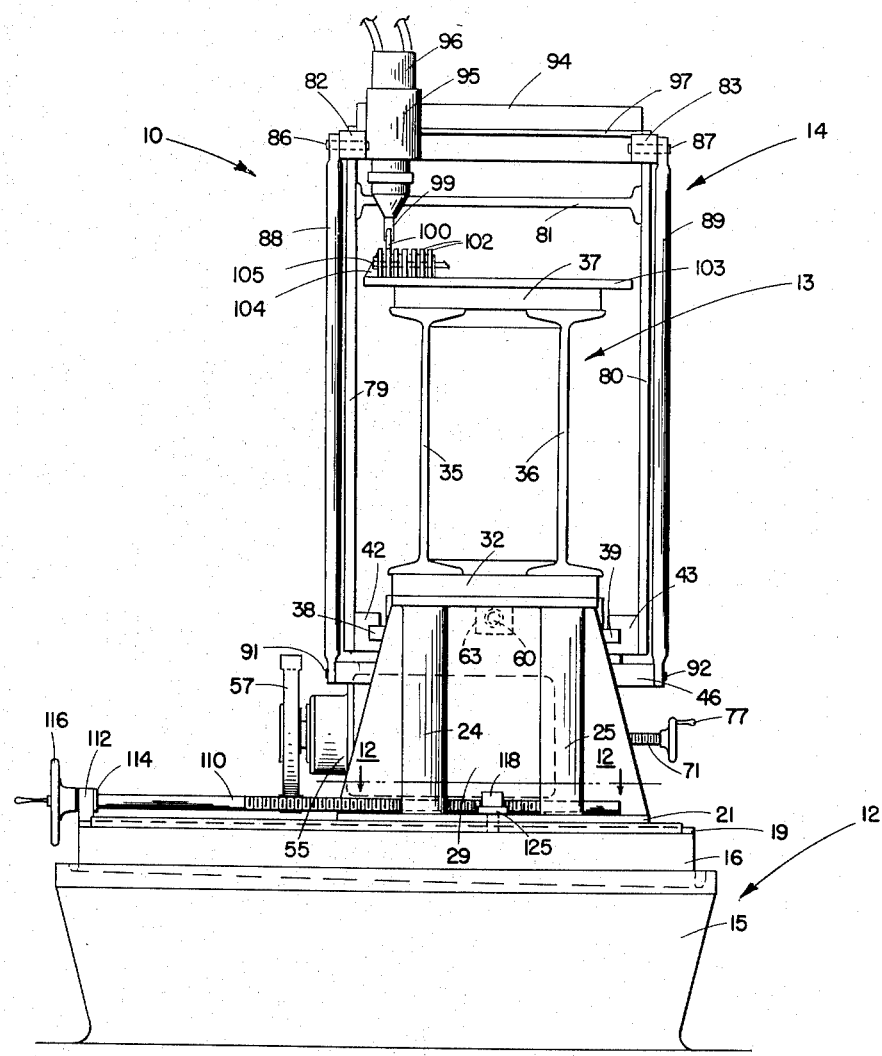
Figure 12:
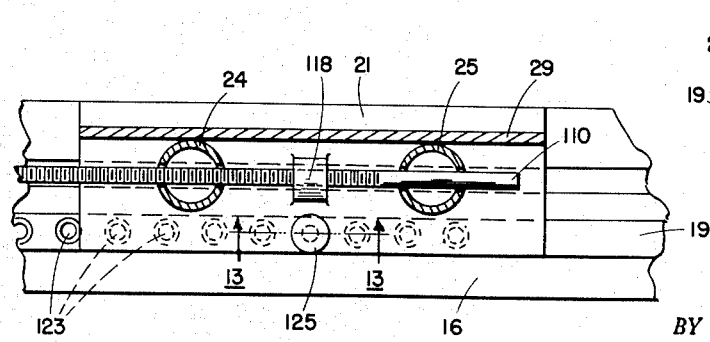
Figure 13:
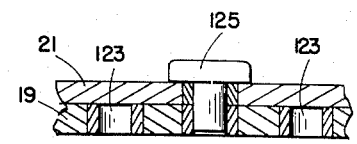

These and other objects will become apparent in the following detailed description taken in connection with the accompanying drawings in which Fig. 1 is a top plan view of a part formed by the machine of this invention, Fig. 2 is a sectional view along line 2—2 of Fig. 1, Fig. 3 is a sectional view along line 3—3 of Fig. 1, Fig. 4 is a side elevational view of the machine of this invention, Fig. 5 is an end elevational view of this machine, Fig. 6 is a sectional view taken along line 6—6 of Fig. 4, Fig. 7 is a top plan view of the machine of this invention, Fig. 8 is a sectional view taken along line 8—8 of Fig. 4, Fig. 9 is a sectional view taken along line 9—9 of Fig. 6, Fig. 10 is an end elevational view of the arrangement shown in Fig. 9, Fig. 11 is a fragmentary sectional view taken along line 11—11 of Fig. 10, Fig. 12 is a sectional view taken along line 12—12 of Fig. 5, Fig. 13 is a fragmentary sectional view taken along line 13—13 of Fig. 12, Fig. 14 is a fragmentary sectional view taken along line 14—14 of Fig. 4, and Fig. 15 is a fragmentary side elevational view of a modification of this invention.

The machine of this invention is adapted to make a part such as illustrated in Figs. 1 through 3. The part shown is an integrally stiffened wing panel 1 for use in a modern high performance aircraft. This panel is designed for maximum strength and minimum weight, which causes it to assume the irregular contour shown. Such a panel may have a skin portion 2 and a plurality of stiffener elements 3 integral with the skin portion. The skin portion may be tapered both laterally and lengthwise so that it is of varying thicknesses at the various parts of the wing panel. In addition, the stiffeners in the part illustrated are not parallel but converge to the right, or toward the end of the wing panel. Furthermore, these stiffeners are not of uniform depth. The sculptured skin portion also has thicker laterally extending portions 4 which may be for receiving fastening elements upon subsequent assembly of the wing panel into the aircraft, or may be for providing the unit with greater strength. Thus it is obvious that the wing panel 1 is an extremely complex part requiring a very difficult machining operation.

Milling machine 10 as shown in the drawing comprises a bed portion 12, a frame assembly 13 and a carriage assembly 14 which is carried by the frame.

Bed 12 may be made up of a concrete or steel base 15 upon which rests a cast Kirksite slab 16. The workpiece is held on the Kirksite slab in any suitable manner for a cutting operation by the cutter unit which is associated with the carriage assembly.

The bed is also adapted to hold the frame assembly and for this reason it includes guide plates 18 and 19 disposed on top of slab 16 at its opposite ends. Plates 20 and 21 of the frame rest on the top of guide plates 18 and 19 and serve to support the frame on the bed. The frame includes columns 22, 23, 24 and 25 which are secured, such as by welding, to the top of plates 20 and 21. The tops of the columns, in turn, carry plates 26 and 27. Columns 22 and 23 are welded to a gusset 28 and plates 24 and 25 are similarly secured to gusset 29, which provide the frame assembly with rigidity and strength. The upper portion of the frame includes a longitudinal portion 31 which is supported on plates 26 and 27. Thus bottom plate 32 of portion 31 extends between plates 26 and 27 and is pivotal at either end about pins 33 and 34 which are connected with plates 26 and 27 respectively. This pivotal arrangement is provided for reasons which will be made more clear hereinafter. A pair of rigid I beams 35 and 36 are carried by bottom plate 32 and extend the length of the frame assembly. A top plate 37 covers the tops of the beams.

Also extending longitudinally above the bed is a pair of rails 38 and 39 which are disposed below bottom plate 32 and are attached thereto. These rails serve to support and guide carriage assembly 14, the latter including a plate member 41 provided with the pair of upwardly projecting flanges 42 and 43 adapted to receive the rails thereby holding the cutter assembly to the rails and thus to the frame assembly. Depending downwardly from plate 41 is a pair of brackets 44 and 45. Support plate 46 is pivotally secured to these by shaft 47. The opposite end of the support plate 46 connects by pin 49 to rod 50 of the follower unit 51, and this unit is in turn supported by the carriage through brackets 52 and 53. The function of this follow-up member will be more fully explained hereinafter.

Guide ways, or gibs, are provided in the support plate 46 which are adapted to engage complementary flange portions 54 of support brackets for a motor 55. Thus the guide ways of support bracket 46 act to support the motor. Motor 55 includes a rotatable shaft 56, to which is attached milling cutter 57, the latter including sharpened cutting portions 58 and 59. The rotating cutter is adapted to engage the workpiece with cutting portions 58 and 59 making a cut in the workpiece upon such engagement.

During a cutting operation the cutter assembly travels longitudinally above the machine along rails 38 and 39. This travel of the cutter assembly is accomplished by means of lead screw 60 which is threadably received in bracket 61 of the cutter assembly. The lead screw is journalled in bearings 62 and 63 of the frame and is axially fixed in a suitable manner such as by collars 64 and 65 on the shaft. The lead screw is rotated by means of motor 66 which is mounted on the frame and drives the lead screw through belt 67 and pulley 68. Rotation of motor 66, and thus of lead screw 60, advances the carriage assembly along the rails, to the right as illustrated in Fig. 4, the rails and the frame thus serving as a guide means for the cutter. It is obvious thus far that when the cutter is rotating and in engagement with the workpiece with lead screw 60 also rotating, the cutter will be advanced along the workpiece in a straight line defined by the path of the rails, thereby effecting a cut in the workpiece.

An additional motor 69 may be also mounted on the frame and connected with the drive shaft of motor 66, and thus with lead screw 60, by means of belt 70. This second motor can be used as a quick return for the carriage assembly after it has traveled the length of its cut, serving to rotate the lead screw in the reverse direction by means of the belts and pulleys to thereby move the carriage in the opposite direction.

In order that a cut may be made in the desired portion of the workpiece the cutter may be moved transversely of the machine. This is accomplished by means of another lead screw 71 which is threadably received in bracket 72 of plate 46. Lead screw 71 is journalled in bracket 73 of the housing of motor 55. Suitable collars 75 and 76 are provided on either side of bracket 73 so that the lead screw is rotatable in the journal but axially fixed relative thereto. A hand wheel 77 is provided on the end of the lead screw for enabling rotation thereof. Rotation of the hand wheel, and thus of lead screw 71, moves the motor along the guide ways of plate 46 and shifts the motor and cutter transversely of the machine. By these provisions it is possible to make a series of parallel cuts with the cutter. The cutter unit may be moved longitudinally by lead screw 60 for one cut and then moved transversely by lead screw 71 for a second parallel cut.

A provision is also made for varying the depth of the cut which is made. Rod 50 of follower member 51 raises or lowers support plate 46 about shaft 47 to position the cutter with respect to the bed in accordance with the desired depth of cut. This variation in the depth of cut can be made as the cutter moves along the rails in a cutting operation. In order that the cutter will follow the proper vertical path a template unit is provided to cause the follow-up unit to move in accordance with a predetermined pattern. For this purpose the carriage assembly is provided with sides 79 and 80 attached to flanges 42 and 43 and extending vertically upward. These sides extend beyond top plate 37 of the frame assembly and are rigidly joined together by cross piece 81, secured to the two sides.

Pivotally connected to the top portion of the two sides is a pair of brackets 82 and 83 connected to the side by pins 84 and 85 respectively. These pins are disposed, in the embodiment illustrated, directly above pivot shaft 47 of the plate 46. The opposite ends of brackets 82 and 83 are pivotally connected by means of pins 86 and 87 to a pair of vertical bars 88 and 89. These vertical bars are in turn connected to support plate 46 by means of pins 91 and 92 which are located directly beneath pins 86 and 87. Plate 46 with the vertical sides of the carriage assembly, the brackets, and the vertical bars, cooperate to form a parallelogram linkage whereby brackets 82 and 83 move simultaneously and equally with plate 46.

Also interconnecting the two sides is a cross-bar 94 which carries, by means of bracket 95, a valve unit 96. This valve unit is a part of a follower unit which also includes unit 51, the support for the end of the plate 46. Valve unit 96 can be slid transversely of the machine across bar 94 on bracket 95 guided in keyway 97. The valve unit may be positioned laterally of the machine by means of a suitable set-screw arrangement 98.

Valve stem 99 of valve unit 96 carries a wheel 100 which is adapted to engage and ride upon any one of a plurality of templates 102. These templates are carried upon plate 103 which is in turn carried by plate 37 of the frame unit. These templates may be held in place in any suitable manner, such as by means of brackets 104 and bolts 105 extending through the brackets and the templates. As illustrated, the centerline of the valve stem is directly above the centerline of the cutter. Hydraulic lines 106 and 107 extend from valve unit 96 to the other portion 51 of the follower unit. A detailed design of such a follower or position transmitting unit may be seen in U. S. Patents Nos. 2,130,109 and 2,263,110. These units operate such that when valve unit 96 is open or closed because of the movement of the valve stem and the valve stem wheels upon the template, the information is transmitted through the hydraulic lines 106 and 107 to unit 51. This unit contains a piston which is moved up or down by hydraulic fluid in the lines. This causes piston rod 50 to move vertically in accordance with the movement of the valve stem, thus pivoting the support plate 46. This movement of the support plate therefore raises or lowers the cutter, adjusting its position to follow the path of the template traversed by wheel 100 on top of the frame assembly.

Thus at the beginning of a cut unit 96 is positioned on cross-piece 94 so that wheel 100 will engage a template having a desired contour. The cutter is also set by means of lead screw 71 so that the cut will be made in the workpiece at the proper transverse location. Lead screw 60 is then rotated by means of motor 66 and advances the cutter assembly longitudinally of the machine, causing the cutter to engage the workpiece in a cutting operation. The template, meanwhile, through the position-transmitting units 96 and 51 causes the cutter to move vertically up and down in accordance with the pattern of the template, and thus controls the vertical depth of the cut. If it is desired to have the next cut of the same vertical contour as the previous cut, unit 96 may be retained in its original position. However, the cutter itself may be moved transversely by means of lead screw 71 so that the second cut can be taken in a different place. If it is desired to change the vertical contour of the next or any succeeding cut, unit 96 may be moved across the cross-piece 94 and again clamped into place above the template having the desired pattern for the particular cut. As many templates may be provided as there are necessary contours for the various cuts.

When the cutter has reached the end of its cutting stroke and it is desired to return the cutter to its initial position for another cutting operation, it may be raised above the workpiece to preclude interference therewith in any of a variety of suitable methods. One way of accomplishing this is to provide each of the templates with a high portion at the end thereof so that when the cutter reaches the end of its cut it will be raised high above the workpiece because of the raised portion of the template. A valve 108 may be provided in hydraulic line 107 which connects with unit 51 below the piston. When the cutter has been raised above the workpiece valve 108 may be closed, preventing escape of fluid from beneath the piston. This locks the cutter in a raised position for the return stroke, after which the valve may be opened when the unit is to again move longitudinally of the machine in making the next cut.

This machine is also designed to make the cuts in the workpiece at varying angles. Thus it is possible, for example, to mill into a solid piece of metal various reinforcing elements which are angularly disposed relative to each other in a manner illustrated in Figs. 1-3. To accomplish the angular adjustment of the cut, the frame assembly is pivoted while the bed remains stationary. This movement of the frame is accomplished by laterally moving plate 20 of the frame on plate 18 of the bed or plate 21 of the frame on plate 19 of the bed, or, as is normally the case, both plates 20 and 21 may be moved relative to the bed. Lead screws 109 and 110 are provided for effecting this movement. These lead screws are journalled in brackets 111 and 112, respectively, which are secured to the bed and are axially fixed relative thereto by means of collars 113 and 114, and hand wheels 115 and 116 which are attached to the lead screws. Lead screws 109 and 110 pass through support columns 22, 23 and 24, 25 as best seen in Fig. 12 although there is no attachment between the lead screws and the columns. Bracket 118 is attached to plate 21, and a similar bracket is secured to plate 20 to threadably receive the lead screws so that rotation of the lead screws will advance the plates, and thus the frame assembly, transversely of the machine. Opposite rotation of lead screws 109 and 110 will cause opposite movement of the two ends of the frame.

Plates 20 and 21, with matching plates 18 and 19, have a suitable guide means so that the lateral movement of the frame in varying its angularity relative to the bed will be uniform. Thus, for example, keyway arrangements indicated at 103 and 104 may be provided. As plates 20 and 21 are moved, the upper portion of the frame may pivot relative to the rest of the frame about pins 33 and 34.

In order that the frame may be accurately positioned angularly with respect to the bed there may be provided openings 122 and 123 in plates 18 and 19, respectively, which serve as indexing holes. A single opening is provided in plate 20 through which may be inserted a pin 124 which will engage any one of indexing openings 122. A similar opening is in plate 21 so that pin 125 may engage a desired indexing hole 123. Additional clamping means 143 and 144 may be provided to firmly position the frame in its angular positions.

When the frame is shifted angularly with respect to the base there must of course be provision made for a slip joint so that the frame will be free to move to its angular position as the base plates slide in their keyways. One method of successfully providing such a joint is that best illustrated in Fig. 14, wherein plate 27 is provided with an elongated slot 127. Pin 34 of the frame engages a block 128 which has square sides and is free to slide within opening 127. When the frame is moved angularly with respect to the base, block 128 will slide within the opening 127 allowing a slippage so that the frame may be moved angularly without interference from the pivot pin 34. If so desired, springs 129 and 130 may be provided on either side of block 128.

It is thus obvious that if desired, after making one or more parallel cuts using one or more templates as described above, the frame may be shifted angularly with respect to the base which will cause the cutter to move thereafter at an angle with respect to the workpiece, thus making the next cut at an angle to the cut previously made. One or more cuts may be made at this second angle and then the frame shifted to still another angle if so desired, and so on. In this manner it is possible to make a part such as illustrated in Figs. 1 through 3 in which the stiffeners are not parallel to each other and in which the cuts must necessarily be made at varying angles. This machine is then, by simple and quickly made adjustments, able to make such a part, or another equally complicated part in which the workpiece is tapered in two or three directions, and in which the workpiece is sculptured and machined out to provide portions of varying thickness and varying contour. By means of its simplified construction this machine can be made at far less cost than for many other machine tools.

Various modifications of the arrangement of the parts are possible without departing from the scope of this invention. For example, there may be a direct mechanical connection between the template means and the cutter for causing the cutter to follow a desired pattern. Or there may be a combination electrically and hydraulically driven unit for accomplishing this result. Magnetic tape may be used to send information to the cutter for governing the vertical path of the cut and various other position transmitting units may be employed. The term "template means" as used herein is intended to include all such means of indicating a path for the cutter to follow.

According to one of the modifications of this invention, an all-electric type follower unit may be utilized and an arrangement suitable for such a unit is illustrated in Fig. 15. For this unit support plate 46 has a bracket member 131 suitably secured to the upper surface thereof above the cutter unit. Bracket 131 includes a threaded opening 132 which is adapted to receive threaded shaft 133 of motor 134. This motor may be of reversible type and is attached to the carriage assembly by suitable means such as bracket 135. Thus rotation of shaft 133 of motor 134 will either raise or lower support plate 46, depending upon the direction of rotation, by reason of threaded connection between bracket 131 and the motor shaft.

A bracket 136 is also included with this unit and its vertical ends are received within guides or bearings 137 and 138 which are secured to the sides of the carriage. Bracket 136 additionally includes a slotted opening 139 which is adapted to receive a pin 140 of unit 131. This pin thus supports bracket 136 which is guided in a vertical path by means of guides 137 and 138. Thus the bracket is caused to move vertically with support plate 46 and the cutter. Bracket 136 carries a photoelectric cell unit 141 which is slidable along the bracket and can be set in any desired position by means of a set screw 142. For this electrically operated unit a template 145 may be attached to one side of the frame assembly behind the photocell unit. This template may be of the ordinary type in which a plurality of template lines 146 are marked on the surface of the template in terms of light and dark areas. At the beginning of a cut the photoelectric cell unit 141 is positioned at one of the template lines as desired by means of set screw 142. A suitable hookup interconnects the photoelectric cell and motor 134 so that the motor will rotate in a direction depending upon the signal from the photoelectric cell. In this manner the motor is caused to rotate in a direction depending upon the direction of the template lines causing support plate 46, and thus the cutter, to be either raised or lowered in accordance with information from the template. The action of the machine for the electric unit is thus essentially the same as for the hydraulic unit except that an electrical hookup is utilized instead of the hydraulic type unit.

The foregoing detailed description is to be clearly understood as by way of illustration and example only and is not to be interpreted as by way of limitation, the spirit and scope of this invention being limited only by the appended claims.

We claim:

1. A machine tool comprising a bed having a work-supporting surface; a frame, said frame including guide means defining a straight path parallel to said work-supporting surface of said bed; a carriage assembly on said frame; means engaging said carriage assembly for effecting movement thereof relative to said frame along said straight path of said guide means; cutter means carried by said carriage assembly for engaging a workpiece on said work-supporting surface during such movement of said carriage assembly and effecting a cut in the direction of said straight path of said guide means; means for effecting movement of said cutter means in a direction perpendicular to said work-supporting surface during said movement of said carriage assembly for varying the depth of cut by said cutter means; means for causing said cutter means to effect successive parallel cuts in a workpiece, said means including means for laterally moving said cutter means with respect to said carriage assembly thereby to vary the lateral position of said cutter means relative to said straight path of said guide means for directing said cutter means through parallel paths; and means for causing said cutter means to effect successive non-parallel cuts, said means including adjustable means for pivoting said frame with respect to said bed thereby to angularly adjust said straight path of said guide means for directing said cutter means through angularly displaced paths.

2. A machine tool comprising a work supporting means; a cutter; means for supporting said cutter; guide means defining a straight path adjacent said work supporting means, said guide means engaging said cutter supporting means for transmitting the same through said straight path for enabling said cutter to effect a cut in a workpiece on said work supporting means; means for causing said cutter to effect successive parallel cuts in such a workpiece, said means including adjustable means for laterally positioning said cutter with respect to said cutter supporting means thereby to vary the lateral position of said cutter with respect to said straight path of said guide means; means for causing said cutter to effect successive non-parallel cuts, said means including adjustable means for pivoting said guide means with respect to said work supporting means for positioning said straight path in angularly displaced positions for thereby directing said cutter in angularly displaced paths; and means for adjusting the depth of cut by said cutter during movement of said cutter supporting means on said guide means in a cutting operation.

3. A machine tool comprising a work supporting horizontal bed; a frame associated therewith, said frame including two end supports on opposite end portions of said bed, and an interconnecting member extending between said end supports in spaced parallelism with said bed, said interconnecting member being pivotally connected with said end supports and defining a straight horizontal path; template means on said interconnecting member; a carriage assembly carried by said interconnecting member and movable along said straight horizontal path; a cutter on said carriage assembly for engaging a workpiece on said bed and effecting a cut therein when said carriage assembly is moved along said straight path; means for causing said cutter to effect successive parallel cuts in a workpiece on said bed, said means including means for adjusting said cutter transversely relative to said carriage assembly; means for causing said cutter to effect successive non-parallel cuts in said workpiece, said means including means for differentially moving said end supports with respect to said bed so as to pivot said interconnecting member relative to said bed for varying the angular position of said straight path with respect to said bed; and means engaging said carriage assembly and said cutter for positioning said cutter vertically during a cutting operation.

4. A machine tool comprising a bed adapted to support a workpiece on the upper surface thereof; a frame adjacent said bed, said frame including a longitudinal portion defining a straight path; a carriage on said frame movable in said straight path; a cutter assembly carried by said carriage, said cutter assembly including a rotatable cutter for engaging a workpiece on said bed and effecting a cut therein; vertically positioning means connected with said cutter assembly and operable to alter the vertical position of said cutter relative to said workpiece; template means on said longitudinal portion; transfer means engaging said template means and said vertically positioning means and operable to control said vertically positioning means in accordance with the pattern of said template means whereby the vertical position of said cutter is adjustable during movement of said carriage for controlling the depth of cut effected by said cutter; bracket means interconnecting said transfer means and said cutter assembly for causing said transfer means to move vertically with said cutter assembly; means for causing said cutter to effect successive parallel cuts, said means including adjustable means for varying the lateral position of said cutter with respect to said carriage; and means for causing said cutter to effect successive non-parallel cuts, said means including support members pivotally connected to said longitudinal portion, engaging said bed and movable relative thereto to pivot said longitudinal portion with respect to said bed thereby to angularly displace said longitudinal portion and the path defined thereby.

5. A machine tool comprising a rotatable cutter; a carriage assembly for carrying said cutter; a longitudinally extending member defining a straight longitudinal path supporting and guiding said carriage assembly along said path; vertical support means engaging said longitudinally extending member; a bed adjacent said support means, said bed including a work-supporting upper surface disposed adjacent said cutter whereby said cutter can effect a straight cut in a workpiece supported thereby when said carriage assembly moves along said straight path of said longitudinal member; template means carried by said longitudinal member; position transmitting means engaging said cutter assembly and said template means and operable for vertically positioning said cutter relative to said carriage assembly for controlling the vertical position of said cutter relative to said bed thereby controlling the depth of cut made by said cutter; means for causing said cutter to effect successive parallel cuts, said means including means for moving said cutter transversely with respect to said carriage assembly thereby varying the transverse position of said cutter with respect to said straight path defined by said longitudinal member; and means for causing said cutter to effect successive non-parallel cuts, said means including means engaging said vertically supporting means for horizontally moving the same relative to said bed through an angular path with respect thereto whereby said straight path is displaced angularly with respect to said bed.

6. A machine tool comprising a work-supporting bed; a longitudinally extending member defining a straight path in parallelism with said bed; vertical support means engaging said longitudinally extending member at either end thereof and interconnecting the same with said bed, said vertical support means being pivotally connected to said longitudinally extending member and including an adjustable connection with said bed whereby said vertical support means are individually movable transversely with respect to said bed and operative to pivot said straight path with respect to said bed; a carriage assembly supported by said longitudinally extending member and movable through said straight path; power driven means for reciprocating said carriage assembly through said straight path; a cutter assembly supported by said carriage assembly, said cutter assembly including a rotatable cutter for engagement with a workpiece on said work-supporting bed to effect a straight cut in such a workpiece during movement of said carriage assembly along said straight path of said longitudinally extending member, said cutter assembly including means for transversely displacing said cutter with respect to said carriage assembly whereby said cutter is adjustable to effect successive parallel cuts, said cutter assembly including vertically movable means for controlling the vertical position of said cutter with respect to said bed thereby to control the depth of cut effected by said cutter; and means connected with said vertically movable means for automatically effecting operation thereof during movement of said carriage assembly along said straight path of said longitudinal member in accordance with a predetermined pattern for automatically controlling the depth of said cut by said cutter.

References Cited in the file of this patent

UNITED STATES PATENTS

| | | |
|---|---|---|
| 1,551,648 | Eaton | Sept. 1, 1925 |
| 1,925,025 | Amann | Aug. 29, 1933 |
| 2,086,915 | Kopp | July 13, 1937 |
| 2,321,441 | Webber | June 8, 1943 |
| 2,431,604 | Birmann | Nov. 25, 1947 |
| 2,635,340 | Schwab | Apr. 21, 1953 |
| 2,674,160 | Martellotti | Apr. 6, 1954 |